Patented Dec. 22, 1953

2,663,617

UNITED STATES PATENT OFFICE 2,663,617

WATER RESISTANT PROTEIN MATERIALS

Hugh J. Hagemeyer, Jr., Kingsport, Tenn., assignor to Eastman Kodak Company, Rochester, N. Y., a corporation of New Jersey No Drawing. Application August 24, 1950, Serial No. 181,320

5 Claims. (Cl. 18—54)

This invention relates to the preparation of protein materials which are resistant to the effects of water obtained by the acetoacetylation of the proteins with diketene, and then treating the so-formed material with formaldehyde.

It is desirable that materials employed for fibers, foils or filaments have good wet strength and water resistance, a fairly high softening point, and resistance to the effect of water and treatment with aqueous liquids. For instance, in the case of textile materials, resistance to the effects of laundering is desired. In the case of photographic films, the film base should be resistant to processing baths which are employed in connection therewith. Also it is desirable that material used for these various purposes be resilient, have a good feel, have good dimensional stability, and in the case of textile fibers to be resistant to creasing.

One object of my invention is to prepare protein materials which in the form of filaments, threads, yarns, ribbons and the like have increased laundry and wearing resistance. Another object of my invention is to prepare a protein material, fibers of which have good water resistance, high wet strength, and desirable properties as regards softening point, resiliency, handle, dimensional stability, and crease resistance. A further object of my invention is to prepare a material having these properties by treating protein with diketene and subjecting the so-treated material to the action of formaldehyde or a formaldehyde-forming material. Other objects of my invention will appear herein.

The objects of my invention are accomplished by the acetoacetylation of proteins with diketene and subsequently subjecting that material to treatment with formaldehyde or a formaldehyde-forming compound, particularly after the material has been formed into threads, filaments, ribbons, foils, films, or the like. I have found that proteins contain reactive groups which can be acetoacetylated with diketene with or without catalyst together with a modified protein composition. Typical proteins which may be used as the starting material in accordance with my invention include zein, casein, gluten, egg albumin, silk fibroin, and feather keratin. Diketene reacts with the primary amino or primary amide groups thereof to form an acetoacetamide. The —COCH$_2$CO-group adds on to the structure of the protein in that it readily reacts with aliphatic aldehydes in the presence of a mildly basic catalyst to form a cross-linked material. For instance, with zein the cross-linking action which occurs is illustrated by the following equation:

2 Zein.COCH$_2$COCH$_3$ + RCHO ⟶

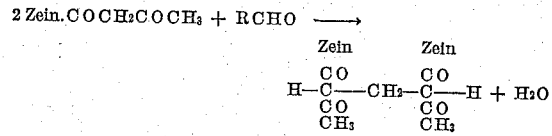

Both of the hydrogen atoms on the methylene carbon are reactive and any degree of cross-linking desired can be obtained. This process has the considerable advantage over the prior art in that the acetoacetylation can be carried out prior to the forming of the protein film, foil, or fiber, and in this manner any degradation due to the action of an acetylating mixture on the protein in its final form is avoided. Diketene also has a high reactivity towards basic amino and amide groups and no catalyst is required for the acetoacetylation. Since the diketene provides active points for aldehydic cross-linking of the protein chains, it is possible to prepare a completely acetylated protein composition according to the process of the present invention.

The reaction between the diketene and the protein will take place at room temperature or, if desired, at some increased temperature if thought to be desirable. The reaction occurs just as well without as with a catalyst and, therefore, no catalyst use is necessary. The acetoacetylation of proteins can be carried out in several ways. For instance, the dry protein can be added gradually to the diketene, to a solution of diketene in an inert organic solvent or the diketene can be added to a solution of the protein. Casein and zein in particular can be dissolved or suspended in suitable solvents or combinations thereof and treated with the desired amount of diketene. Because of the greater reactivity of the diketene for the active points of the proteins, i. e., primary amino, basic and primary amide groups, it is possible to carry out the acetoacetylation in the presence of water and/or alcohols without appreciable hydrolysis or esterification. Typical solvent mixtures which are suitable in this step are: water-acetone, water-alcohol, and alcohol-methylene dichloride. The acetoacetylation proceeds rapidly at ordinary temperatures and, as a rule, temperatures above about 80° C. are unnecessary in this step.

The formaldehyde treatment is best accomplished by treating the acetoacetylated protein while in the form of films, threads, yarn or the like with an aqueous solution of formaldehyde having a temperature of 70–80° C., which formaldehyde solution contains a very small proportion of some mildly alkaline catalyst such as pyridine, sodium carbonate, dilute alkali, or sodium acetate. The strength of the formaldehyde solution should be at least 3% and not more than 10% is ordinarily sufficient. Although the best results have been obtained from dilute formaldehyde solutions, the described effects can be obtained by treating the filaments or threads by solution of a formaldehyde-forming material in the solution which is to be employed for preparing the ribbons, filaments, foils or films. Also a small proportion of mildly alkaline catalyst would be desired. After the solution has been coated, it is desirable when a formaldehyde-forming material is used to heat the threads or ribbons for a short time at a temperature of 110–130° C. to release the formaldehyde within the material. Some of the formaldehyde-forming materials which may be incorporated in dopes or solutions in the practice of my invention are para-formaldehyde, hydroxy methyl nitroparaffins, methylol melamine, or, in fact, any formaldehyde-forming material which can be dissolved in the solution to be spun, coated or extruded and which will release its formaldehyde at a temperature which will not decompose the acetoacetylated protein material. The products thus obtained have a very small moisture absorption and exhibit but minor, if any, shrinkage by treatment with hot water.

The amount of mildly alkaline catalyst employed in the formaldehyde treatment need only be a trace, such as on the order of .001–.01%. Larger proportions of base may be present but do not exhibit any increased effect. In addition to the catalyst mentioned above, other catalysts which may be employed for use in the formaldehyde treatment are quinoline, trimethylamine, monoethylamine, alpha or beta picoline, or, for that matter, any basic material of an organic nature. The following illustrates my invention.

*Example I*

40 parts of zein were dissolved in a solvent containing 20 parts of water and 80 parts of acetone. 5 parts of diketene were added and the solution was agitated at 25° C. for 1–2 hours. Skins were coated from the solution, which skins were dried at room temperature overnight. Strips cut from these skins could be drafted 200% at 80° C. in hot water. The stretched strips were cured by treating with 10% formalin containing 0.1% pyridine at 40° C. for 15–30 minutes. The strip after drying with hot air showed negligible shrinkage in boiling water.

*Example II*

40 parts of zein were treated with diketene as in the previous example. The solution was then coated out to form foils, which foils were treated with a 3% formalin solution containing 0.1% pyridine as a catalyst at 25° C. for 15 minutes. After washing and drying the foils were cut into strips and drafted to 300% of the original length. The final cure was obtained by treating with 10% formalin containing 0.1% sodium hydroxide at 40–50° C. for 20 minutes. These foils were dried in warm dry air and upon treatment with boiling water showed not more than 3–4% shrinkage.

*Example III*

40 parts of zein were dissolved in 30 parts of diketene and 70 parts of acetone. Solution was obtained by beginning the addition of the zein to the diketene alone. Acetone was then added gradually to decrease the viscosity until all of the zein was dissolved. Foils of the acetoacetylated protein were coated out and dried at room temperature. Immersion of the foils in 10% formalin at 70–80° C. using pyridine as a catalyst gave a cross-linked and insolubilized zein skin. The modified foils had only a 4% susceptibility to moisture as compared with 16–17% susceptibility for the untreated zein.

*Example IV*

Zein fibers were obtained by dry spinning a 40% solution of zein in a 50:50 mixture of methanol-methylene dichloride. The fibers formed were partially cured by treating with dilute aqueous formaldehyde solution and stretching the same. These partially cured zein fibers were then acetoacetylated by treating with a 10% solution of diketene in carbon tetrachloride. A final cure was obtained by treating the fibers with a 10% formaldehyde solution using 0.1% sodium hydroxide as a catalyst at 70° C. for fifteen minutes.

*Example V*

40 parts of casein were dissolved in 50 parts of diketene to which as solution was obtained 50 parts of acetone were slowly added. Foils were coated from this solution and dried at 25° C. overnight. The modified casein was immersed in a 10% formalin solution containing 0.1% pyridine and heated at 50–60° C. The casein foils so treated were cross-linked by the formaldehyde and exhibited a low susceptibility to water.

I claim:

1. A process for the preparation of attenuated protein material which comprises forming a solution of a protein, aceto acetylating the protein while in solution, with diketene whereby —CO—CH$_2$—CO— groupings are obtained therein, imparting an attenuated form to the aceto acetylated protein and treating the so formed protein derivative with an aqueous solution of formaldehyde of 3–100% concentration and a mildly alkaline catalyst which solution has a temperature of 40–80° C., whereby cross linking is induced in the attenuated product as evidenced by no appreciable shrinkage thereof upon treatment of the same with hot water.

2. A process for the preparation of attenuated zein material which comprises forming a solution of zein, aceto acetylating the zein while in solution with diketene whereby —CO—CH$_2$—CO— groupings are obtained therein, imparting an attenuated form to the aceto acetylated zein and treating the same with an aqueous solution of formaldehyde of 3–10% concentration and a mildly alkaline catalyst which solution has a temperature of 40–80° C., whereby cross linking is induced in the attenuated product as evidenced by no appreciable shrinkage thereof upon treatment of the same with hot water.

3. A process for the preparation of attenuated casein material which comprises forming a solution of casein, aceto acetylating the casein while in solution with diketene whereby

—CO—CH$_2$—CO— groupings are obtained therein, imparting an attenuated form to the aceto acetylated casein and treating the same with an aqueous solution of formaldehyde of 3–10% concentration and a mildly alkaline catalyst which solution has a temperature of 40–80° C. whereby cross linking is induced in the attenuated product as evidenced by no appreciable shrinkage thereof upon treatment of the same with hot water.

4. A process for the preparation of attenuated protein material which comprises forming a solution of a protein, aceto acetylating the protein while in solution with diketene whereby

—CO—CH$_2$—CO— groupings are obtained therein, imparting an attenuated form to the aceto acetylated protein and treating the same with an aqueous solution of formaldehyde of 3–10% concentration and pyridine which solution has a temperature within the range 40–80° C. whereby cross linking is induced in the attenuated product as evidenced by no appreciable shrinkage thereof upon treatment of the same with hot water.

5. A process for preparing protein filaments which comprises forming a solution of zein, aceto acetylating the zein while in solution with diketene whereby —CO—CH$_2$—CO— groupings are imparted to the zein, forming the aceto acetylated zein into filaments and treating the filaments with an aqueous solution of formaldehyde of 3–10% concentration and a mildly alkaline catalyst which solution has a temperature of 70–80° C. whereby cross linking is induced in the attenuated product as evidenced by no appreciable shrinkage thereof upon treatment of the same with hot water.

HUGH J. HAGEMEYER, Jr.

References Cited in the file of this patent

UNITED STATES PATENTS

| Number | Name | Date |
|---|---|---|
| 965,137 | Goldsmith | July 19, 1910 |
| 2,171,241 | Johnson | Aug. 29, 1939 |
| 2,236,768 | Veatch | Apr. 1, 1941 |
| 2,342,634 | Atwood | Feb. 29, 1944 |
| 2,525,792 | Gordon et al. | Oct. 17, 1950 |

FOREIGN PATENTS

| Number | Country | Date |
|---|---|---|
| 536,841 | Great Britain | May 29, 1941 |
| 593,928 | Great Britain | Oct. 29, 1947 |

OTHER REFERENCES

Silk Journal & Rayon World, July 1947, pages 46, 51. "Protein Rayons."